July 5, 1955  W. C. STUEBING, JR  2,712,430
LIFT TRUCK

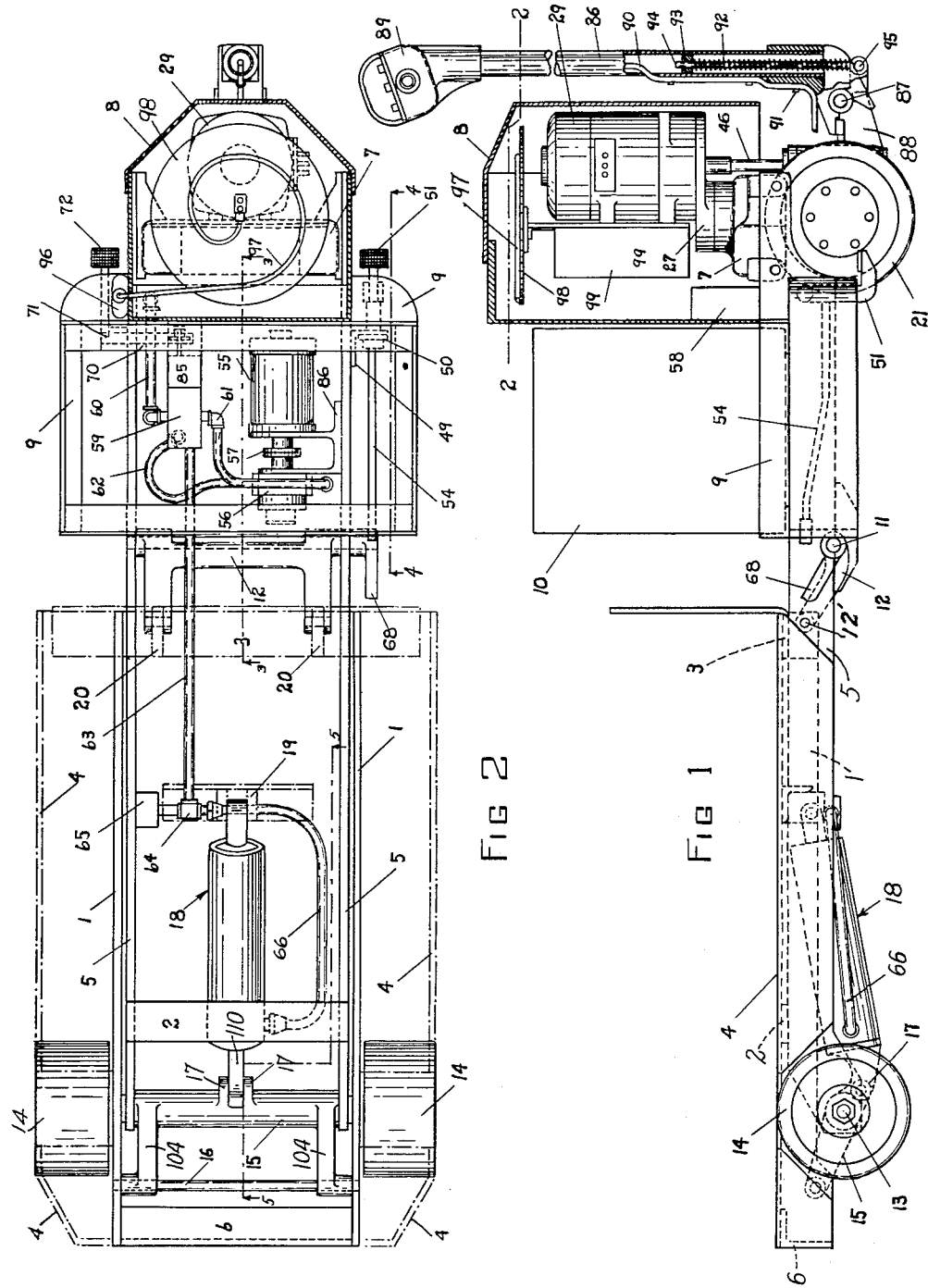

Original Filed Sept. 26, 1946  3 Sheets-Sheet 2

INVENTOR
Walter C. Stuebing, Jr.
BY
Curtis, Morris & Safford
ATTORNEYS

July 5, 1955 W. C. STUEBING, JR 2,712,430
LIFT TRUCK
Original Filed Sept. 26, 1946 3 Sheets-Sheet 3

INVENTOR
Walter C. Stuebing, Jr.
BY
Curtis, Morris + Safford
ATTORNEYS

United States Patent Office

2,712,430
Patented July 5, 1955

2,712,430

LIFT TRUCK

Walter C. Stuebing, Jr., Cincinnati, Ohio

Original application September 26, 1946, Serial No. 699,569. Divided and this application February 1, 1951, Serial No. 208,895

1 Claim. (Cl. 254—2)

This invention relates to lift trucks and more in particular to a lifting apparatus for motorized lift trucks. This application is a division of my copending application, Serial No. 699,569, filed September 26, 1946, entitled Lift Truck, and issued October 14, 1952, as Patent No. 2,613,753.

An object of this invention is to provide a positive, simple lifting means. A further object is to provide a means for rapid and smooth raising and lowering of the pallet of said lift truck. A further object is to provide sturdy and dependable support for the load when elevated. These and other objects will be in part obvious and in part pointed out below.

In the drawings:

Figure 1 is a side view with parts broken away of a lift truck embodying this invention;

Figure 2 is a top view of the truck with parts broken away and with the right-hand portion of the figure in section on the line 2—2 of Figure 1;

Figure 3:
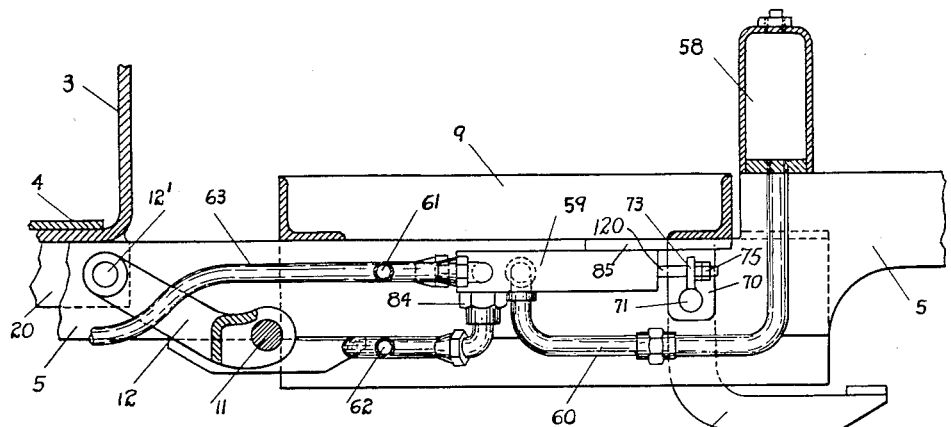
Figure 4:
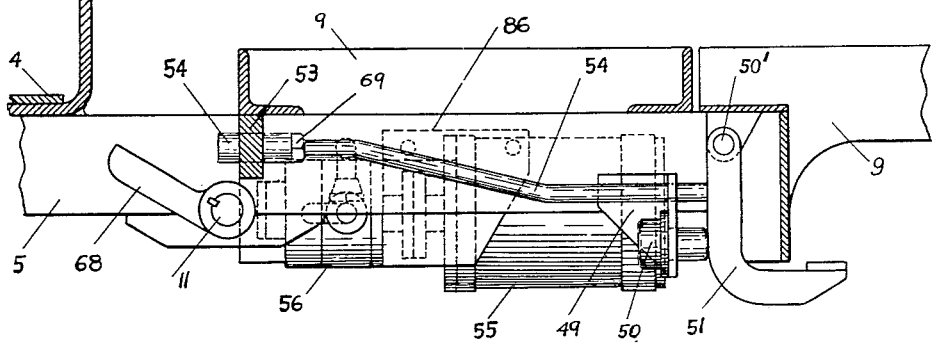
Figure 5:
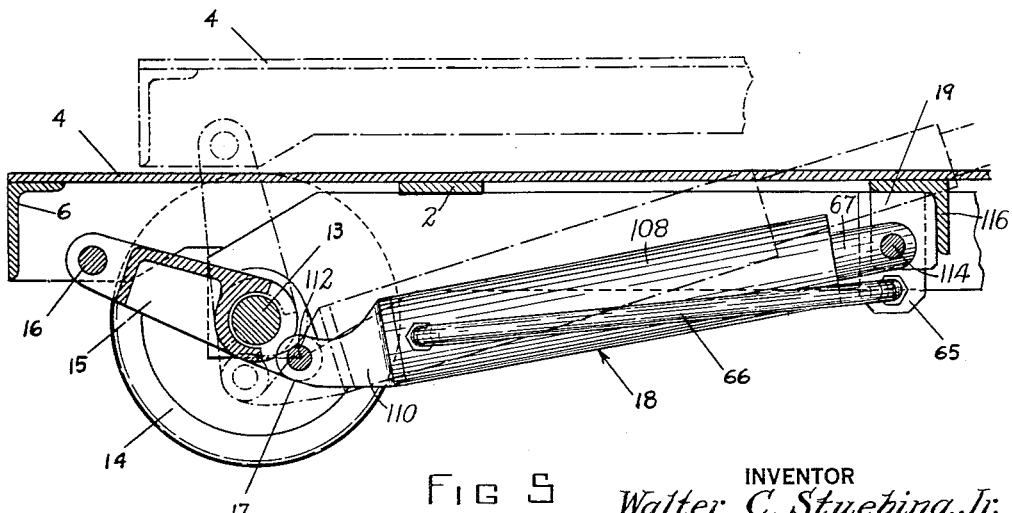
Figure 6:
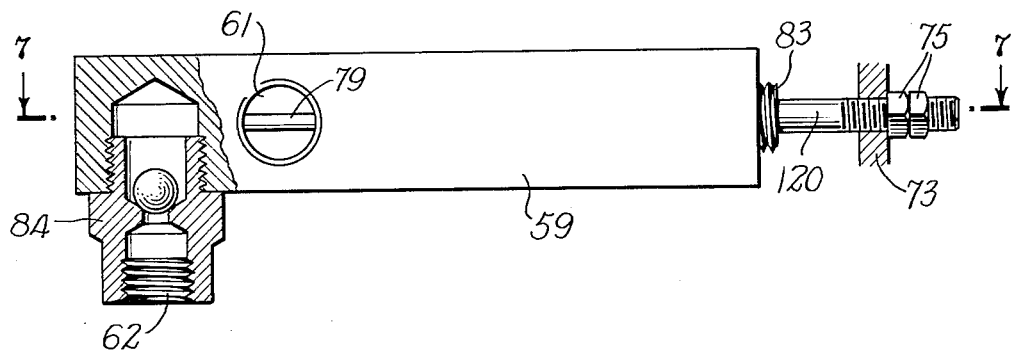
Figure 7:
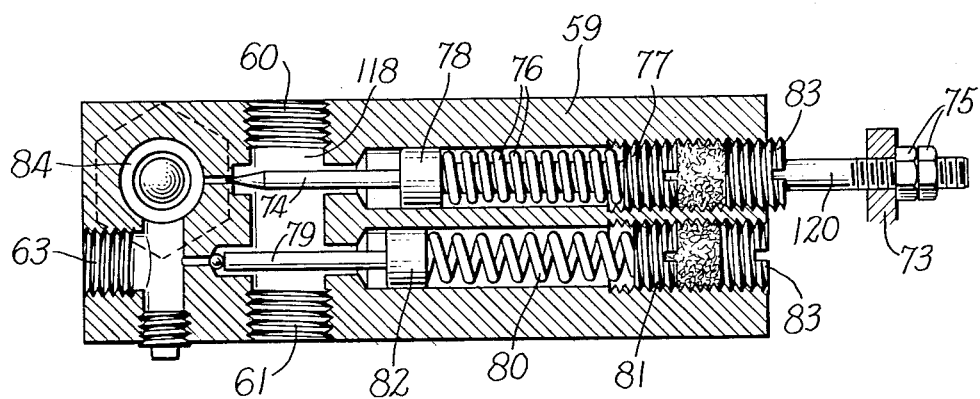

Figures 3, 4, and 5 are enlarged vertical sections along the lines 3—3, 4—4 and 5—5, respectively, of Figure 2;

Figure 6 is an enlarged view of the control valve with parts broken away;

Figure 7 is a sectional view on the line 7—7 of Figure 6.

Referring particularly to Figures 1 and 2 of the drawings, the truck has a lower frame which forms part of the chassis and a lifting frame which is swingably mounted on the lower frame. The lifting frame is formed by a pair of side rails 1 (Figure 2, a rear tie bar 6, a front tie bar 3 and a top plate 4. The lower frame is formed by a pair of side rails 5, a rear tie bar 2 and the head assembly 7. The rear of the truck is supported by a pair of wheels 14 journaled on a shaft 13 which is fixed in rails 5 of the lower frame. The forward end of the truck is supported on a pair of wheels 21 which are pivoted to provide for the steering of the truck and which are also the drive wheels through which the truck is driven.

The lifting frame is mounted on the lower frame by a link assembly so as to swing between the lower position shown in Figure 1 and a raised position wherein it engages and lifts the load. This link assembly is formed by a link 12 at the forward end of the lifting frame and a link 15 at the rear end of the lifting frame. Link 12 has two integral sleeves by which it is pivotally mounted on a shaft 11 carried by rails 5 of the lower frame, and the link is connected to the lifting frame by a pair of pins 12' each of which extends through a pair of ears on the link 12 and a knuckle 20 integral with tie bar 3. Link 15 has a sleeve portion which encloses the central portion of axle 13 and a pair of arms 104 at the opposite ends of this sleeve portion; each of these arms is provided with an integral sleeve through which a shaft 16 extends. Shaft 16 is fixed at its ends in rails 1 thus to provide for support of the rear end of the lifting frame by link 15. The lifting frame is raised and lowered under the control of a hydraulic system which includes means for supplying oil under pressure to a hydraulic unit 18 (shown in Figure 3) for raising the lifting frame; this unit also holds the lifting frame in elevated position and controls the lowering of the frame.

Unit 18 has a cylinder 108 upon one end of which is an integral knuckle 110; knuckle 110 extends between a pair of knuckle arms 17 on link 15 and a pin 112 extending through the knuckles provides a pivotal connection between unit 18 and link 15. Arms 104 and 17 of the link 15 are angularly spaced approximately 160° apart about the sleeve of link 15 so as to provide a maximum mechanical leverage advantage within a minimum of vertical space. Unit 18 has a ram 67 within cylinder 108 and the projecting end of this ram is pivotally connected by a pin 114 to a pair of ears 19 which are integral with a bracket 116 welded to the underside of top plate 4 of the lifting frame.

For raising the lifting frame, oil under pressure is supplied to the hydraulic unit through a pipe 66 and this causes ram 67 to move to the right out of cylinder 108 thereby extending the hydraulic unit. When this occurs a force is exerted at the left-hand end of the hydraulic unit through pin 112 to knuckle arms 17. This force tends to swing link 15 clockwise and the moment of this force is transmitted to the lifting frame through shaft 16 so as to tend to lift the lifting frame. Simultaneously, a force is exerted at the right-hand end of the hydraulic unit by ram 67 through pin 114 and ears 19 to the top plate 4, and (see Figure 1) this force also tends to swing the lifting frame toward its elevated position. The force thus exerted on top plate 4 is the main lifting force, but the force exerted on shaft 16 by link 15 is quite effective in insuring a smooth lifting action. The combined effect of these two forces is such that the lifting frame is raised with a steady, even movement and the elevating effort is spread out uniformly through the arc of travel of the lifting links. The action is such as to avoid a condition where the hydraulic unit pushes with the links near "dead center"; that is, the leverage action of the hydraulic unit on the rear link 15 tends to cause the rear end of the lifting frame to move at once into contact with the load, but at the same time the forward end of the hydraulic unit pushes upwardly and forwardly on the lifting frame.

When the lifting frame is in the fully elevated position, links 12 and 15 are substantially upright and the load is given sturdy and dependable support. However, the links slant slightly to the rear with the hydraulic unit exerting a constant holding force, and, when the relief valve for the hydraulic system is opened, the oil flows from the hydraulic unit and the lifting frame moves downwardly. During this downward movement the hydraulic unit acts as a check with the relief valve limiting the rate at which oil is discharged from the hydraulic unit. During movement of the lifting frame the effective lever arms through which the forces of the hydraulic unit act change; that is, when the lifting frame is near its lower position, the piston travels faster in relation to the speed of the lifting frame than when the lifting frame is near its elevated position. This causes the load to be lowered at a rapid rate, but it is decelerated gently as it reaches the end of the descent.

The mechanism for controlling the flow of oil to and from hydraulic unit 18 so as to raise and lower the lifting frame is mounted on the lower frame beneath cradle 9. Referring particularly to Figure 2, this mechanism includes a rotary pump 56 driven by a motor 55 through a coupling 57. Pump 56 receives oil from a reservoir 58 (see Figure 3), through a pipe 60, a passageway 118 of a valve assembly 59 and a pipe 61 (Figure 2). The pump supplies high pressure oil through a pipe 62 and a passageway 84 of the valve assembly to a pipe 63 and thence through a fitting 64 to pipe 66 and to the hydraulic unit. During the lifting operation the action of the valve assembly is to provide for the passage of the oil from the reservoir to the pump and the passage of the high pressure oil from the pump to the hydraulic unit. The action of the valve assembly during the lowering operation is to permit the oil from the hydraulic unit to flow back to the reservoir at a controlled rate.

The details of construction of this valve assembly are shown in Figures 6 and 7. Referring particularly to Figure 7, a needle valve 74 and a ball valve 79 are mounted in parallel relationship and are both adapted to open and thus connect a passageway 84 to a passaway 118. As noted above, passageway 84 provides the connection between the outlet from pump 56 and the hydraulic unit, and passageway 118 is connected at one side to the reservoir through pipe 60 and at the other side to the intake of the pump by pipe 61. Thus, when either of valves 74 or 79 is open the pump outlet is connected to the pump inlet and the hydraulic unit is connected to the oil reservoir. During the lifting operation both of these valves are closed, but valve 79 opens automatically whenever the oil pressure in passageway 84 becomes excessive. Needle valve 74 is the relief valve referred to above which is opened to permit restricted flow of the oil from the hydraulic unit to the reservoir when the lifting frame is being lowered. Ball valve 79 is spring urged toward its closed position by spring 80, one end of which engages the shoulder 82 of the ball valve and the other end of which is held in adjusted position by a screw plug 81. Needle valve 74 is similarly urged by a spring 76 one end of which engages a shoulder 78 of the valve and the other end of which is held by an adjusting screw 77. Packing nuts 83 hold packing material against screw plugs 77 and 81 and thus prevent leakage.

Needle valve 74 has a valve stem 120 which projects from the right through the center of spring 76 and through snug openings in plugs 77 and 83. The end of this valve stem projects through the upper end of a valve release lever 73 (see Figure 3) which is fixed to a horizontal shaft 71. Shaft 71 is rockably mounted in a bracket 70 and (see also Figure 2) it carries at the end opposite lever 73 a release treadle 72. Stops (not shown) limit the movement of treadle 72 so that it may move only a limited distance clockwise from the position shown in Figure 3. When the treadle is thus moved, lever 73 swings clockwise and pulls valve stem 120 and valve 74 to the right against the action of spring 76 (Figure 7); this opens the valve and permits oil to flow from passageway 84 into passageway 118.

Motor 55 is operated by battery 10 (Figure 1) and it is started by depressing a lifting treadle 51 on the right-hand side of the truck. As shown best in Figure 4, treadle 51 is rockably mounted on the lower frame by a pin 50' supported by a pair of ears, and the treadle rests against the plunger of a switch 50 which has a strong spring urging the plunger to the right so that the switch is held open. However, when the treadle is depressed, the switch plunger slides to the left and the switch is closed, thereby starting motor 55. The starting of motor 55 causes pump 56 to draw oil from the reservoir and pump the oil under pressure through pipe 62 into passageway 84. Valves 74 and 79 being closed, the high pressure oil passes through pipe 63, fitting 64 and pipe 66 to the hydraulic unit 18 with the result that the lifting frame is moved toward the elevated position. When the load has been elevated treadle 51 is released with the result that switch 50 opens automatically and the motor is stopped. Valves 74 and 79 remain closed and the oil is held in the hydraulic unit so that the lifting frame is held in elevated position. If during the lifting operation the load is in excess of a safe amount, the pressure within passage 84 is excessive and this opens ball valve 79. The opening of ball valve 79 permits the oil to pass from the outlet of the pump into passageway 118 and this relieves the pressure and prevents excessive forces being exerted by the hydraulic unit 18. The pressure at which valve 79 opens may be adjusted in accordance with the conditions of operation by turning screw plug 81.

When it is desirable to lower the lifting frame, treadle 72 is depressed and this opens valve 74, thereby connecting the hydraulic unit through pipe 66, fitting 64, pipe 63, passageway 84 (Figure 7), valve 74, passageway 118 and pipe 60 to the oil reservoir. This permits the oil to flow from the hydraulic unit to the reservoir so that the lifting frame descends. The rate of descent is limited by the rate of flow through valve 74 and the adjustment of the movement of the valve is such that the rate of descent is within the desired limits.

As shown best in Figure 4, mounted on the end of shaft 11 and keyed thereto is a lever 68 which swings with link 12 so that during the lifting operation it swings upwardly toward the vertical position. Slidably mounted in a bracket 53 in alignment with lever 68 is a rod 54, the opposite end of which projects through an opening in bracket 49 and engages treadle 51. The left-hand end of rod 54 carries a sleeve which is threaded onto the rod and is locked in adjusted position by a lock nut 69. Thus, by adjusting the sleeve, the effective length of the rod may be changed and this adjustment is such that when the lifting frame is in the fully elevated position, lever 68 pushes on rod 54 and swings treadle 51 away from switch 50. Thus, if the operator does not remove his foot from the treadle by the time the lifting frame is fully elevated, lever 68 slides rod 54 to the right and thus acts through the rod to lift the treadle and stop motor 55. In this way there is no danger of continuing the pumping of oil after the lifting frame has been fully elevated.

As indicated above the front end of the truck is supported by a pair of wheels 21 with a floating axle differential drive assembly as described in detail in my above copending application. This differential drive permits the use of a front wheel drive combining easy steering with or without power, and the inherent greater stability of two wheels. This easy steering is made possible by the elimination of "scrubbing" encountered in the conventional single wheel front wheel drive since the dual wheels are free to rotate in opposite directions as the driving assembly is turned about the axis of swivel. Mounted vertically above the driving assembly is the driving motor 29 which has a downwardly projecting shaft 46 engaging with the differential drive assembly outside the axis of swivel to drive the truck. This vertical mounting substantially eliminates sparking, chattering and excessive wearing of brushes encountered in the usual horizontally mounted drive. The drive shaft being outside the axis of swivel materially reduces any tendency of the drive assembly to turn upon application of the power as occurs with power drives within the axis of swivel. Motor 29 and starting box 99 are supported upon a king-pin or bracket 27 and are enclosed in a fixed casing 8 and at the left of this casing is a battery 10 which supplies power for driving. Battery 10 is mounted on a cradle 9 carried by the lower frame.

As shown at the right in Figure 1, the driving assembly 32 has integral therewith a steering tongue bracket 88 which provides the pivotal mounting for the steering tongue 86. Bracket 88 carries a pin 87 which extends through ears in the steering tongue and the bracket also carries a pin 95 upon which is pivoted a rod 94 which projects upwardly into the steering tongue and is received in a collar 93. Coiled about rod 94 is a compression spring 92 which bears at its upper end against collar 93 and at its lower end against the top of bracket 88. Thus, as the tongue swings downwardly the spring is compressed and exerts a constantly increasing balancing effect so as to counterbalance the weight of the steering tongue. At the end of the steering tongue is a control head 89 which carries a set of manually operable push button switches by means of which the driving of the truck is controlled.

The electrical control circuit for the operation of the truck comprises three push buttons "forward," "reverse," and "braking," at the top of the steering handle which with their cooperating circuits selectively connect in proper sequence the four main series field windings and the compensating winding of the motor to give the desired control of the truck.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

In a lift truck of the class described including a chassis having a wheel assembly and a lifting frame assembly mounted therein and adapted to be moved to and from an elevated position wherein it engages and lifts a load, means for elevating the lifting frame to a predetermined position including a hydraulic ram assembly operatively connected between said chassis and said lifting frame, valve means for controlling the flow of fluid to and from said ram assembly, a treadle mounted on said chassis and operatively connected to said valve means to control the operation of said ram assembly, pump means and a passageway to supply oil to said ram assembly, said valve means being connected to said passageway, an electric motor to drive said pump means, means forming an electrical circuit to drive said motor including a push-button switch, a second treadle which is swingably mounted to be moved to operate said push-button switch thereby to operate said motor, push rod means extending from said second treadle to adjacent said lifting frame, and lever means connected to said lifting frame so as to be pivoted into engagement with said push rod upon the elevation thereof whereby said second treadle is rendered inoperative and the delivery of further fluid to said ram assembly is prevented upon the elevation of said lifting frame assembly.

References Cited in the file of this patent

UNITED STATES PATENTS

| | | |
|---|---|---|
| 1,841,673 | Raymond | Jan. 19, 1932 |
| 2,163,675 | Germond | June 27, 1939 |
| 2,395,345 | Schreck | Feb. 19, 1946 |
| 2,415,090 | Framhein | Feb. 4, 1947 |
| 2,417,018 | Schroeder | Mar. 4, 1947 |
| 2,668,267 | Chapman | Feb. 2, 1954 |

FOREIGN PATENTS

| | | |
|---|---|---|
| 337,373 | Great Britain | of 1930 |